March 2, 1954
M. O. PETROFF
2,671,202
VIBRATION PICKUP
Filed Feb. 2, 1950
6 Sheets-Sheet 1
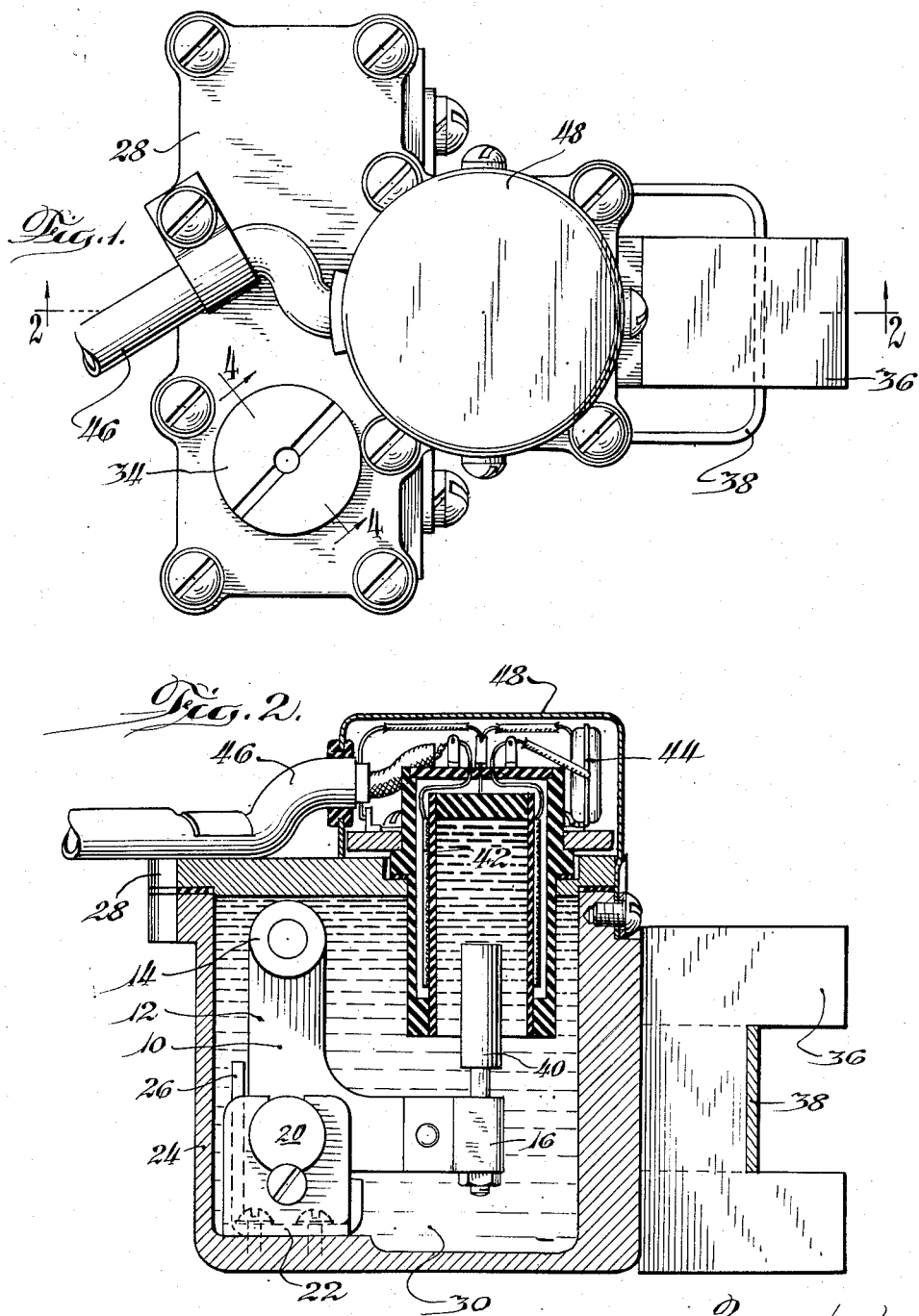
Inventor:
Merlin O. Petroff
By Hinkle, Horton, Ahlberg, Hansmann & Wupper
Attorneys

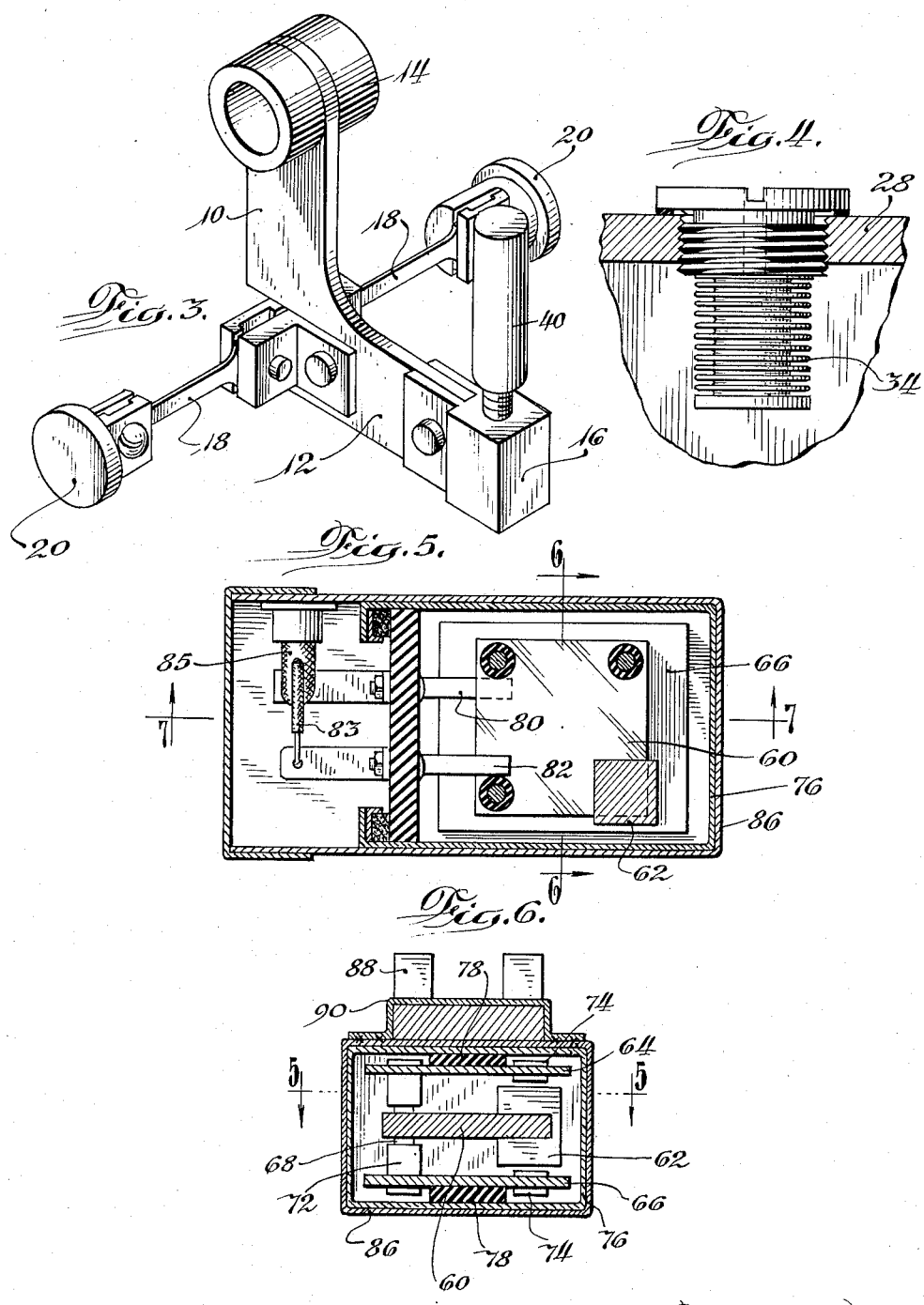

March 2, 1954     M. O. PETROFF     2,671,202
VIBRATION PICKUP
Filed Feb. 2, 1950     6 Sheets-Sheet 3
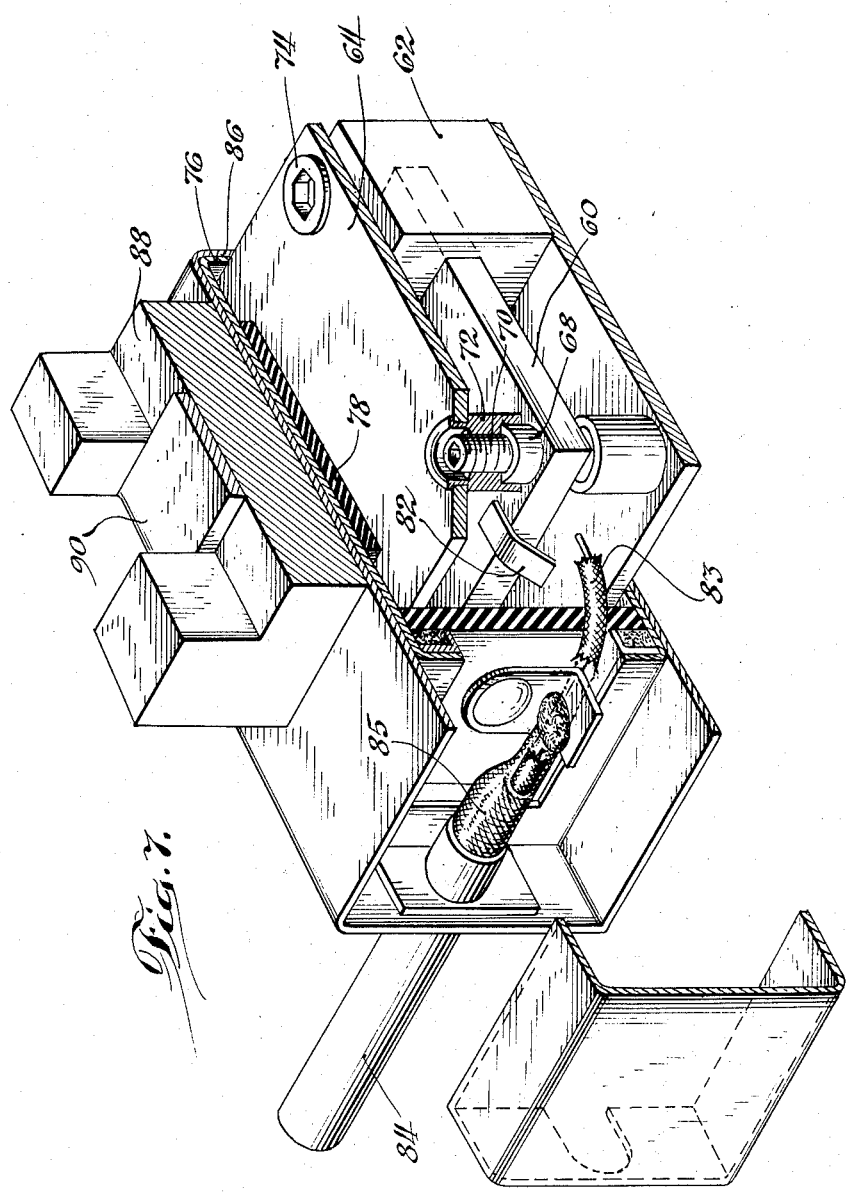

March 2, 1954     M. O. PETROFF     2,671,202
VIBRATION PICKUP

Filed Feb. 2, 1950     6 Sheets-Sheet 4

Inventor:
Merlin O. Petroff
By Hinkle, Horton, Ahlberg, Hansmann & Kupper
Attorneys.

March 2, 1954    M. O. PETROFF    2,671,202
VIBRATION PICKUP

Filed Feb. 2, 1950    6 Sheets-Sheet 5

Inventor:
Merlin O. Petroff
By Hinkle, Horton, Ahlberg, Hansmann & Klupper
Attorneys.

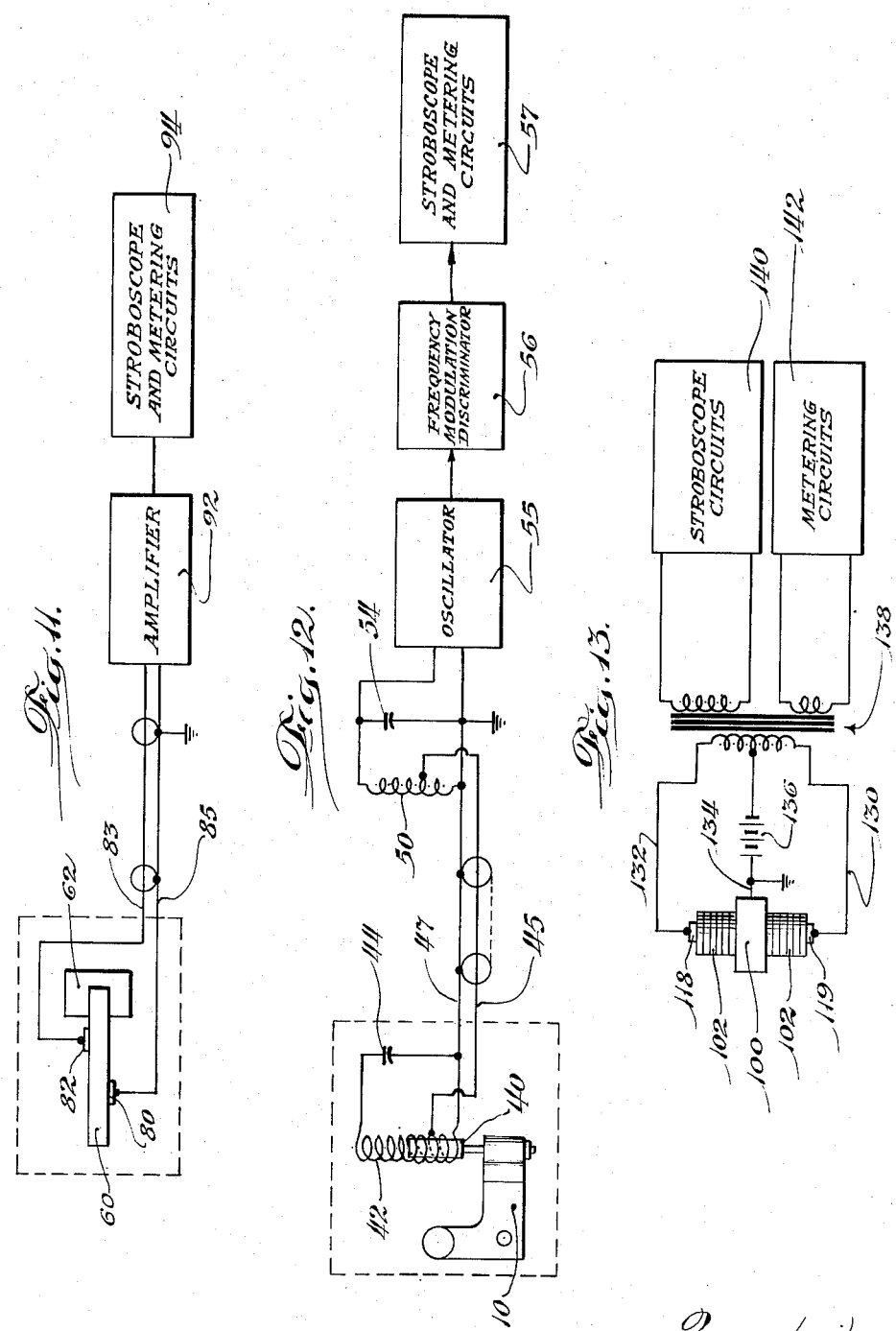

Patented Mar. 2, 1954

2,671,202

UNITED STATES PATENT OFFICE 2,671,202

VIBRATION PICKUP

Merlin O. Petroff, Round Lake, Ill., assignor to Stewart-Warner Corporation, Chicago, Ill., a corporation of Virginia Application February 2, 1950, Serial No. 142,023

4 Claims. (Cl. 336—30)

My invention relates to vibration pickups of the inertia type for translating vibrations into electrical signals.

One of the principal objects of my invention is to provide practicable pickups which need to be attached only to the vibrating body. Such pickups are useful, for example, in the art of automotive wheel balancing. In this art, it is common practice to measure the vibrations of a freely rotating wheel by jacking up the wheel, spinning the wheel to a relatively high speed, and sensing the vibrations of the wheel by means of a pickup attached to the axle and supported by the ground. One difficulty with this method heretofore has been the tendency of the car to shift on the jack or for the jack to sink into the supporting surface. Such shifting has necessitated frequent readjustment of the pickup. Pickups according to my invention need be attached to the vehicle only and need not be supported by the ground or any other means, and shifting of the car on the jack will therefore not have any undesirable effect on the operation of the pickup.

Another object of my invention is to provide vibration pickups which will be faithfully responsive to vibrations extending over a desired range of frequencies including extremely low frequencies.

A further object of my invention is to provide vibration pickups which will be responsive to vibrations in any desired direction including horizontal and vertical directions. Thus, pickups according to my invention are operative without respect to position.

A further object of my invention is to provide an improved vibration pickup which may be easily attached to and detached from the vibrating body.

A further object is to provide an inertia pickup which produces electrical signals modulated substantially in phase with the cyclical displacement variations of a vibratory body.

A further object is to provide an inertia pickup having an electrical output proportional to the vibratory displacement of a body.

A further object is to provide an inertia pickup having an electrical output which is independent of the frequency of the vibrations of a body over a wide operating frequency range.

A further object is to provide an inertia pickup having an electrical output free from spurious responses.

A still further object is to provide pickups which may be readily utilized in conventional circuits of vibration detecting and indicating apparatus.

Other objects and advantages of my invention will appear from the following description taken in connection with the drawings, in which:

Fig. 1 is a top plan view of a first embodiment of my invention;

Fig. 2 is a vertical sectional view taken on the line 2—2 of Fig. 1;

Fig. 3 is an isometric view of a torsional pendulum forming a part of the first embodiment;

Fig. 4 is a fragmentary sectional view taken on the line 4—4 of Fig. 1;

Fig. 5 is a plan sectional view of a second embodiment of my invention taken on the line 5—5 of Fig. 6;

Fig. 6 is an elevational sectional view of the second embodiment taken on the line 6—6 of Fig. 5;

Fig. 7 is an isometric view of the second embodiment with the outer portions cut away on the line 7—7 of Fig. 5;

Fig. 11 is a diagrammatic representation of one mode for utilizing the second embodiment;

Fig. 12 is a diagrammatic representation of one mode of utilizing the first embodiment; and Fig. 13 is a diagrammatic representation of one mode of utilizing the third embodiment.

Figure 8:
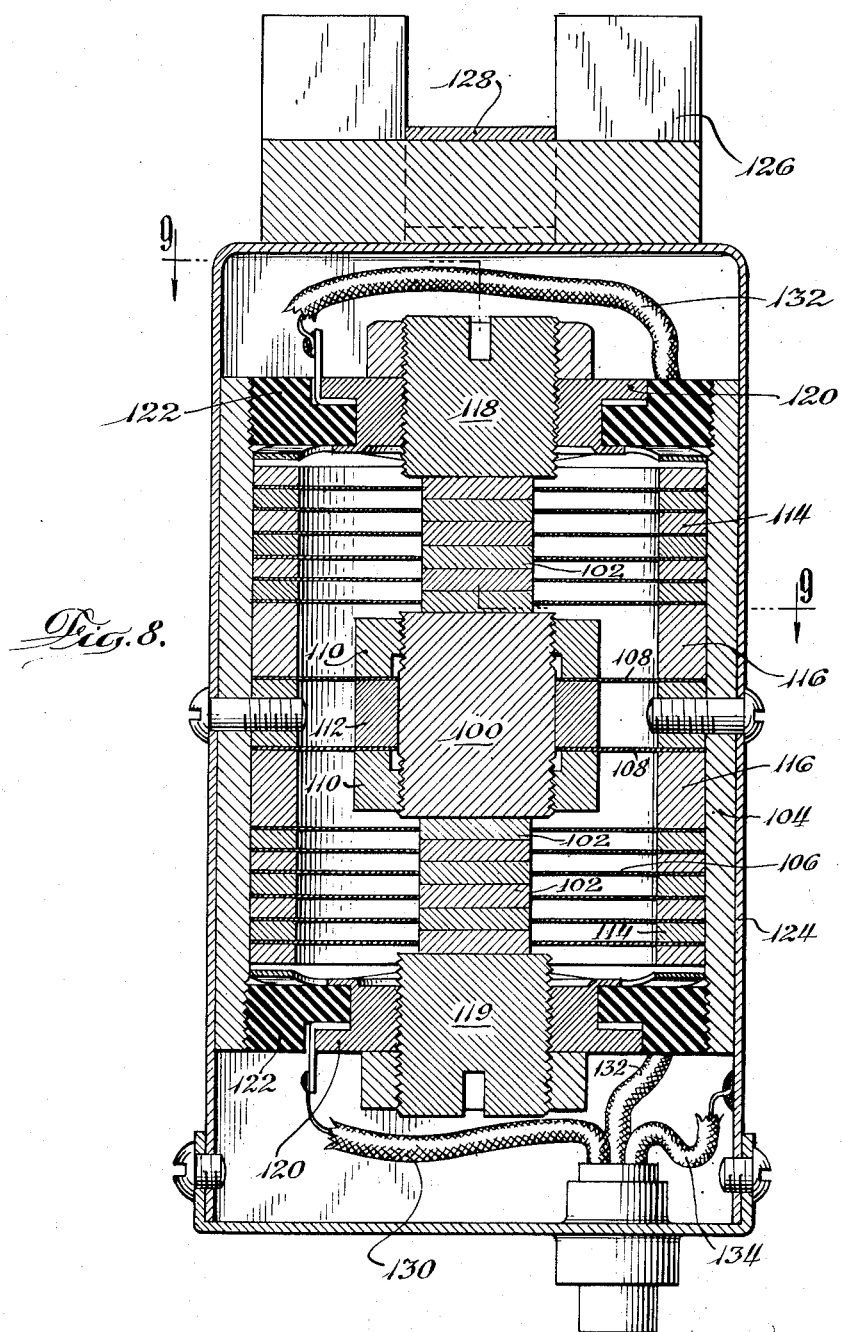
Fig. 8 is an elevational sectional view of a third embodiment of my invention taken on the line 8—8 of Fig. 9.

In Figs. 2 and 3 a right angled pendulum 10 comprises a bell crank 12 supporting two massive bodies or weights 14 and 16 at its ends. The pendulum 10 is mounted on two flat torsional springs 18 which are clamped to the bell crank 12 and to end hubs 20. The hubs 20 are clamped to supporting brackets 22 which are secured to a casing 24. A U-shaped stop 26 secured to the casing 24 serves to limit the range of motion of the pendulum 10.

The casing 24 is hermetically sealed by a cover plate 28 and is completely filled with oil 30. A flexible bellows 34 screwed into the cover plate 28 maintains a slight pressure upon the oil 30 despite expansion or contraction thereof.

A permanent magnet 36 is secured to one end of the casing 24 by a U-shaped clamp 38.

A magnetically permeable core 40, secured to one end of the pendulum 10, extends inside of an oil sealed inductance coil 42 attached to the cover plate 28. A capacitor 44 is connected across the ends of the inductance coil 42 and a coaxial cable 46 is connected with the coil, the axial conductor being connected to a tap on the coil 42 and the outside conductor 47 being connected to one end of the coil 42. A cover 48 attached to the casing 24 surrounds the coil 42 and the capacitor 44.

Because of the provision of the masses 14 and 16 and the torsion springs 18 the torsion pendulum 10 comprises an oscillatory mechanism having a natural or resonant oscillatory frequency. The masses 14 and 16 and the springs 18 are proportioned so that the resonant frequency of the system is substantially less than the lowest vibratory frequency to be picked up and measured so that the pickup substantially is responsive to the displacement of the vibratory body. For example, the resonant frequency may be on the order of one-third to one-half of the lowest vibratory frequency to be measured.

The operation of the first embodiment can best be understood by referring to Fig. 12 which shows that the coaxial cable 46 extends to an apparatus for utilizing the pickup, including an oscillator 55 having a frequency determining tuned circuit including a coil 50 and a capacitor 54 in parallel. The axial conductor 45 of the coaxial cable 46 is connected to a tap on the coil 50, and the outer conductor 47 of the cable 46 is connected to the grounded side of the tuned circuit, and thus the parallel coil 42 and capacitor 44 also are included in the tuned circuit.

For operation, the pickup is firmly attached to a vibrating body, such as the axle of an automobile, by the permanent magnet 26. Thus, the casing 24 and all parts rigidly secured thereto will vibrate in the same manner as the vibrating body because they will be effectively parts of the body. However, the relatively massive pendulum 10 will tend to remain stationary. Forces tending to accelerate the pendulum 10 will be transmitted thereto by the torsional springs 18, but these forces will deform the springs 18, and so the casing 24, including the coil 42, will vibrate with respect to the pendulum 10. Thus, vibrations of the vibrating body will cause relative vibratory motions of the coil 42 and the core 40, and so the inductance of the coil 42 will be varied in response to the vibrations. It will be seen that the coil 42 and the capacitor 44 form a tuned circuit. Variations in the tuning of this tuned circuit will cause variations in the effective inductance of the coil 50 because of the interconnection of the taps on the coils 42 and 50 by the coaxial cable 46. The variations of the inductance of the coil 50 will cause frequency modulation of the oscillator 55 in response to the vibrations received by the pickup. As shown, the frequency modulated signals from the oscillator 55 may be demodulated by a frequency modulation discriminator 56, and the signals thereby obtained may be utilized to operate stroboscope and metering circuits 57 of conventional design.

Since the resonant frequency of the torsion pendulum 10 is substantially less than the lowest vibratory frequency to be measured, the output from the frequency modulation discriminator 56 is substantially in phase with the vibratory displacement variations of the vibratory body. Moreover, the amplitude of the output signals is substantially proportional to the amplitude of the vibrations.

The pendulum 10 is immersed in oil 38 in order to damp the vibrations of the pendulum 10, particularly vibrations at the natural frequency of the pendulum, and at harmonics of the natural frequency. The viscosity of the oil 38 may be such as to provide approximately critical damping of the pendulum 10. The damping provided by the oil 38 improves the uniformity of the response of the pickup to different frequencies and largely eliminates spurious responses at multiples of the resonant frequency of the pendulum 10.

Stroboscope and metering circuits 57 of relatively simple design may be employed because the pickup provides direct indications of the amplitude and phase of the displacement variations of the vibratory body.

The second embodiment of my invention, shown in Figs. 5, 6 and 7, comprises a piezoelectric crystal plate 60 which may be made of Rochelle salt, for example. A massive body or weight 62 is attached to one corner of the crystal plate 60, and the other three corners of the crystal plate 60 are secured to upper and lower mounting plates 64 and 66 by six resilient pads 68, of yieldable material such as a silicone plastic, adjustably mounted in pillars 72 by screws 70. Adjustable stops 74 threaded in the mounting plates 64 and 66 are provided to limit the motion of the massive body 62. The mounting plates 64 and 66 are secured to an inner housing 76 by yieldable isolation pads 78.

Conductive strips 80 and 82, which may be of metallic foil, make contact with the surfaces of the crystal plate 60 and are connected respectively to the outer conductor 85 and the inner conductor 83 of a coaxial cable 84.

The pickup is provided with an outer housing 86 to which is secured a permanent magnet 88 by a U-shaped clamp 90.

The pickup may be secured to a vibrating body by the magnet 78, and then, because of the inertia of the massive body 62, vibrations will be set up between the body 62 and the mounting plates 64 and 66. Such vibrations will cause deformation of the crystal plate 60 and thus corresponding electrical signals between the surfaces of the plate 60. As shown in Fig. 11, the electrical signals may be utilized by means of an amplifier 92 having its input connected to the conductors 83 and 85 of the coaxial cable 84 and supplying amplified signals to conventional stroboscope and metering circuits 94. The amplifier 92 is provided because of the relatively small amplitude of the signals from the crystal pickup. The resilient pads 68 supporting the crystal plate 60 damp the vibrations of the massive body 62 and the crystal plate 60 by virtue of the internal friction in the pads 68, and hence tend to prevent vibrations of the crystal plate 60 and the massive body 62 at their natural frequency. The isolation pads 78 are provided for absorbing vibrations of undesirably high frequencies and for further damping the vibrations of the weight 62.

Figure 9:
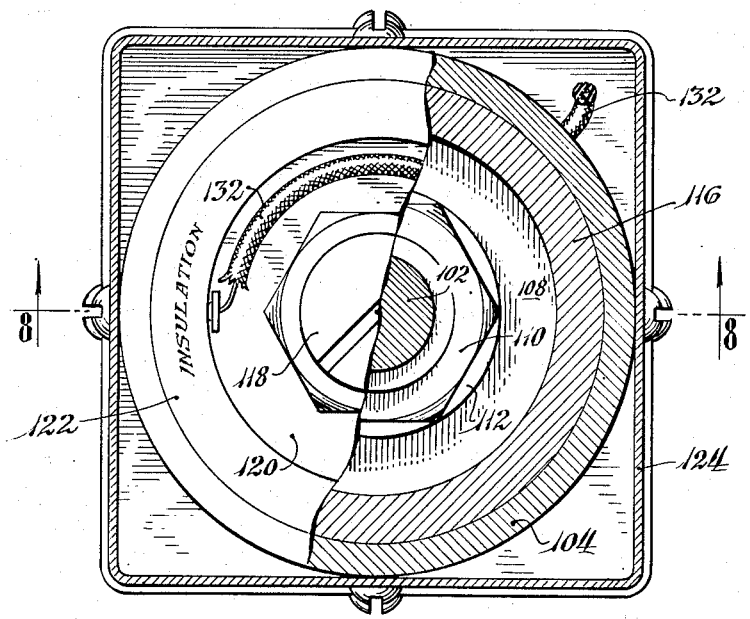
Fig. 9 is a plan sectional view of the third embodiment taken on the broken line 9—9 of Fig. 8.
Figure 10:
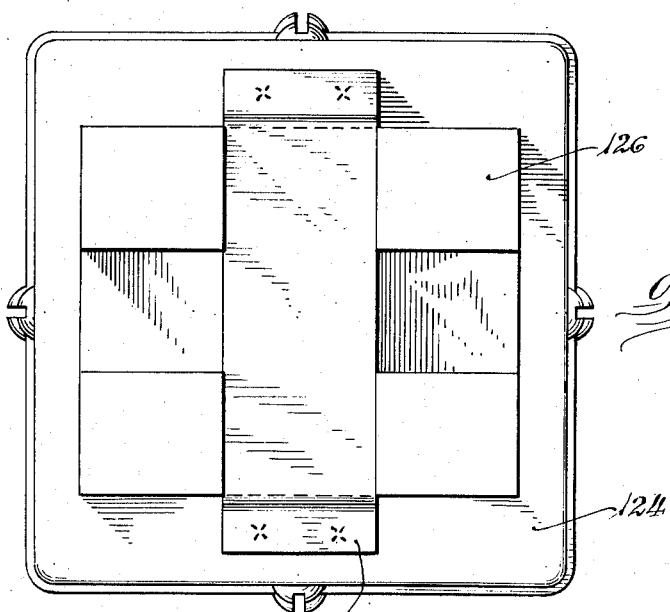
Fig. 10 is a top plan view of the third embodiment.

The third embodiment of my invention, illustrated in Figs. 8, 9 and 10, comprises a massive conductive weight 100 sandwiched between two piles each of six carbon disks 102 which are centered in a tubular casing 104 by electrically insulating perforated disks 106. Two resilient conductive disks 108 are attached to the massive weight 100 by two threaded clamping rings 110 and a spacing ring 112. A plurality of spacers 114 and 116 serve to position the disks 106 and 108.

Adjustable conducting stops 118 and 119 making contact with the carbon piles are threaded through conductive bushings 120 in insulating end plates 122 which are threaded into the ends of the tubular casing 104. An outer housing 124 is provided, to which a permanent magnet 126 is secured by a clamp 128. Three conductors 130, 132 and 134, which may be cabled as shown, are connected respectively to the adjustable stops 119 and 118 and to the massive weight 100 through the outer housing 124 and the resilient disks 108.

As shown in Fig. 13, the conductors 130 and 132 may be connected to the ends of the primary winding of a transformer 138, and the conductor 134 may be connected to the center tap of the primary winding through a source of electric power 136. The conventional stroboscope circuits 140 and vibration metering circuits 142 may be connected to secondary windings of the transformer 138.

When the carbon pile pickup is attached to a vibrating body, vibrations will be transmitted to the casing 104 and the stops 118 and 119. Because of the inertia of the massive weight 100, corresponding vibratory motions between the weight 100 and the stops 118 and 119 will occur. These vibratory motions will cause corresponding variations in the compressional forces exerted upon the carbon piles, and hence variations in the electrical resistance of the piles. The variations in resistance will be translated into electrical signals by means of the circuit including the piles, the transformer 138, and the source 136 in a well known manner, and these signals may be used to control the stroboscope and metering circuits as shown.

It will be apparent to those skilled in the art that by proper proportioning of the mass of the weights, the resiliency of the members supporting the weights, and the amount of damping provided by the damping means, pickups according to this invention will be faithfully responsive to vibrations extending over a desired range of frequencies. Because relatively massive weights may be used, such pickups may be made sensitive to low frequency vibrations.

Vibrations in any desired direction may be sensed by my invention by proper placement of the pickups. The right angled pendulum provided in the first embodiment is inherently sensitive to vibrations in both horizontal and vertical directions. Moreover the pickups shown in all three embodiments may be attached to either horizontal or vertical supporting surfaces since they are not position sensitive, but will operate properly when secured in any desired position.

Pickups such as I have described may be made conveniently small and compact, and because of the provision of the permanent magnets may be readily attached to and detached from vibrating bodies.

While I have described this invention in terms of only three embodiments, those skilled in the art will be able to devise many variations and modifications in structural details without departing from the true scope of this invention. Therefore, I wish to include all alternatives, modifications and equivalents within the legitimate scope of the appended claims.

I claim:

1. A pick-up for electrically manifesting the vibrations of a body, comprising a member adapted to be secured to the body, a pendulum having a substantial rotary moment of inertia, a pair of torsion springs each having one end secured to the pendulum and its other end secured to the member and forming the sole support for the pendulum, the springs providing resilient resistance to relative rotation of the pendulum and the member in either direction, and means to produce electrical signals varying in accordance with relative vibratory movements of the member and the pendulum.

2. A pick-up for electrically manifesting the vibrations of a body, comprising a member adapted to be secured to the body, a pendulum having two arms approximately at right angles to each other, parts having substantial mass at the ends of said arms respectively, means rotatably connecting the pendulum to the member, said means including flat springs forming the sole support for the pendulum and biasing the pendulum against rotation with respect to the member in either direction, and means including an element secured to one of the arms to produce electrical signals varying in accordance with relative vibratory movements of the member and the pendulum.

3. A pick-up for electrically manifesting the vibrations of a body, comprising a member adapted to be secured to the body, a pendulum having two arms approximately at right angles to each other, flat torsion springs connecting the pendulum to the member, the spring means providing resilient resistance to relative rotation of the pendulum and the member in either direction, and means including an element secured to one of the arms to produce electrical signals varying in accordance with the relative vibratory movements of the member and the pendulum.

4. A pick-up for electrically manifesting the vibrations of a body, comprising a casing adapted to be secured to the body, a pendulum in the casing having two arms approximately at right angles to each other, massive weights on the ends of the arms, means rotatably connecting the pendulum to the casing, said means including resilient means biasing the pendulum against rotation with respect to the casing in either direction, the weight of the pendulum and compliance of the resilient means being such as to cause the pendulum to have a very low natural frequency of oscillation, a viscous damping liquid in the casing immersing the pendulum, and means including an element on one of the arms of the pendulum to produce electrical signals varying in accordance with relative vibratory movements of the casing and the pendulum.

MERLIN O. PETROFF.

References Cited in the file of this patent

UNITED STATES PATENTS

| Number | Name | Date |
| --- | --- | --- |
| 1,919,480 | Rieber | July 25, 1933 |
| 1,932,143 | Piercy | Oct. 24, 1933 |
| 2,008,713 | Hayes | July 23, 1935 |
| 2,111,643 | Salvatori | Mar. 22, 1938 |
| 2,112,560 | Davies | Mar. 29, 1938 |
| 2,251,436 | Bentley et al. | Aug. 5, 1941 |
| 2,272,984 | Ritzmann | Feb. 10, 1942 |
| 2,280,437 | Levesque | Apr. 21, 1942 |
| 2,303,413 | Washburn | Dec. 1, 1942 |
| 2,316,616 | Powell | Apr. 13, 1943 |
| 2,337,248 | Koller | Dec. 21, 1943 |
| 2,359,245 | Ritzmann | Sept. 26, 1944 |
| 2,372,056 | Broding | Mar. 20, 1945 |
| 2,387,223 | Carson | Oct. 16, 1945 |
| 2,424,724 | Tolk | July 29, 1947 |
| 2,443,969 | Tyler et al. | June 22, 1948 |
| 2,452,156 | Schover | Oct. 26, 1948 |
| 2,492,238 | Roof | Dec. 27, 1949 |
| 2,559,454 | Mesa | July 3, 1951 |
| 2,562,640 | Reason | July 31, 1951 |